United States Patent [19]

Bell et al.

[11] Patent Number: 5,034,720

[45] Date of Patent: Jul. 23, 1991

[54] CURRENT CONTROL APPARATUS FOR INSERTION INTO BATTERY POWERED DEVICES

[76] Inventors: Howard F. Bell, P.O. Box 1727, Lake Panassoffkee, Fla. 33538; Michael C. Lane, 337 E. Halifax, Mesa, Ariz. 85201

[21] Appl. No.: 555,896

[22] Filed: Jul. 20, 1990

[51] Int. Cl.$^5$ ............................................. H01C 13/00
[52] U.S. Cl. ...................................... 338/219; 338/70; 338/72; 338/272; 338/273; 338/333; 429/121
[58] Field of Search .................... 338/273, 70, 72, 219, 338/272, 333, 334; 429/121, 158; 320/35, 36, 3, 6, 7, 15, 17, 49, 51; 439/225, 246, 247, 500, 754, 913

[56] References Cited

U.S. PATENT DOCUMENTS

| | | | |
|---|---|---|---|
| 2,347,482 | 4/1944 | Kard | 338/219 |
| 3,467,937 | 9/1969 | Norton | 338/219 |
| 3,992,227 | 11/1976 | Persson | 429/121 |
| 4,255,698 | 3/1981 | Simon | 320/35 |

*Primary Examiner*—Marvin M. Lateef
*Attorney, Agent, or Firm*—Steven R. Scott

[57] ABSTRACT

Small easily removable insert designed for placement in the battery compartment of a battery powered device (becoming part of the circuit of the device when in place) which includes a current/voltage control means and may have sidewalls and dimensions which allow the replacement of a battery or batteries standard to the device by smaller sized batteries.

22 Claims, 5 Drawing Sheets

CURRENT CONTROL APPARATUS FOR INSERTION INTO BATTERY POWERED DEVICES

BACKGROUND OF INVENTION

1. Field of the Invention

This invention relates generally to the field of current/voltage control devices and means for electrical apparatus, such as resistors. More specifically, it relates to a means of encasing such current/voltage control means in a casing adapted for insertion into the space or compartment provided for batteries in an apparatus powered by such means.

2. Description of the Prior Art

Devices powered by batteries have achieved a great deal of standardization in terms of battery sizes and their disposition within the devices. Thus, by way of example, most hand held flashlights as well as many other small electrical devices (including toys and radios) utilize standard "AA", "C", or "D" batteries in various numbers. Batteries in each class are uniform in size and shape, therefore dictating a substantial uniformity in the battery compartments within which these batteries are disposed. Battery compartments for devices utilizing such batteries are, in general, designed in such a manner as to hold cylindrically shaped objects (i.e.—batteries) aligned along a common central axis such that their anodes and cathodes (which are positioned at each end of the batteries on said axis) are in electrical contact, providing a series connection. In the past, current/voltage control has been provided by the resistance inherent in the operative elements of the electrical device itself or, when necessary, by inclusion of a resistor at some point in the circuit. To the best of the inventor's knowledge and belief, there has been no modular current/voltage controlling means designed for insertion into the battery compartment itself, nor one that was portable and therefore easily removable and interchangeable between battery powered devices, nor one that (in some of its embodiments) allowed the use of batteries smaller than those for which the device was designed to be used in the device.

SUMMARY AND OBJECTS OF INVENTION

The instant invention provides a readily inserted, interchangeable and portable means of controlling current and voltage in battery powered devices by exploiting the uniformity of batteries and battery compartments in such devices. In addition to the previously mentioned uniformity in such compartments dictated by the uniformity in the size and design of batteries, such compartments are almost invariably provided with some spring biasing means such that batteries are firmly held in place when inserted. This spring biasing also provides a minimal leeway, by additional spring compression, for the insertion of a body with minimal thickness between batteries (or between a battery and its electrical contact point with the device) in almost all battery compartments. The instant invention exploits this leeway by providing a small current control means (generally a resistor) enclosed in a casing with minimal thickness having electrical contacts positioned on its surface such that this invention becomes part of the circuit of a battery powered device when it is properly inserted into its battery compartment. The casing can also be possessed of features that allow the replacement of larger batteries (e.g.—"D" batteries) by smaller batteries (e.g.—"C" or "AA" batteries).

The aforesaid arrangement accomplishes numerous desirable objects and results when the instant invention is inserted into the battery compartment (circuit) of a battery powered device, including the following:

(a) It provides the user with the ability to selectively reduce the amount of current flowing through the device and/or to reduce the voltage across the device's operative elements (b) It extends the useful service life of a device's batteries by reducing their rate of current flow, thereby creating substantial cost savings. This of great importance in civilian and military use situations where replacement batteries are unavailable (i.e. - combat, combat manuevers, hurricanes, etc.).

(c) It protects both incandescent and LED (light emitting diode) lamps from burnout caused by the high current and voltage impact from new batteries (d) It provides the user with the ability to selectively reduce light output from incandescent lamps used in flashlights; providing a range of possible outputs ranging both in intensity and color from white to yellow to orange (the difference in usable light is not critical in many situations); thereby also providing a means to protect night vision when used in flashlights for military purposes.

(e) It allows the replacement of the industry standard incandescent lamps for any particular flashlight by a flashlight lamp having a lower energy rating, thereby further extending battery service.

(f) It allows the user to selectively reduce the rate of energy flow in toys, radios, and other battery operated devices, particularly during the initial period after insertion of a new battery. This can be of great assistance to parents, sparing them the excessive noise and activity generated by such devices when used by children with fresh batteries while simultaneously extending battery life.

(g) It can be easily and quickly removed without tools from a flashlight or other battery powered device at any time to immediately restore maximum available light or energy output when that is needed.

(h) It allows the production of LED (Light Emitting Diode) light source lamps in smaller sizes as the mandatory controlling resistor need not be placed within the LED lamp itself.

(i) It reduces the substantial battery disposal problems associated with the use of batteries, particularly for the military, by extending battery life and thereby reducing the number of batteries that are used (and hence must be disposed of) over any period of time.

(j) It allows, in some of its many possible variations, the substitution of smaller, less expensive batteries for batteries currently used (having the same voltage rating) in a variety of devices (including flashlights). This also results in a reduction in weight for the device, a distinct advantage where the device must be held or carried for long periods of time. Thus, as experiment has confirmed, batteries of different sizes may, by virtue of this invention, be used together in a totally innovative fashion.

DETAILED DESCRIPTION

Figure 1:
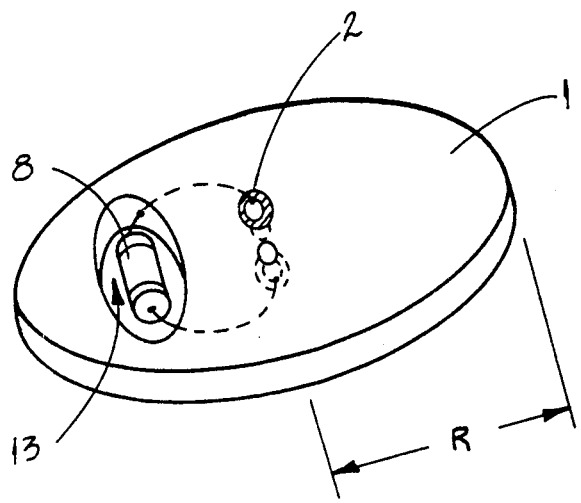
FIG. 1 provides a perspective view of a disc shaped version of the instant invention having a single resistor.
Figure 2:
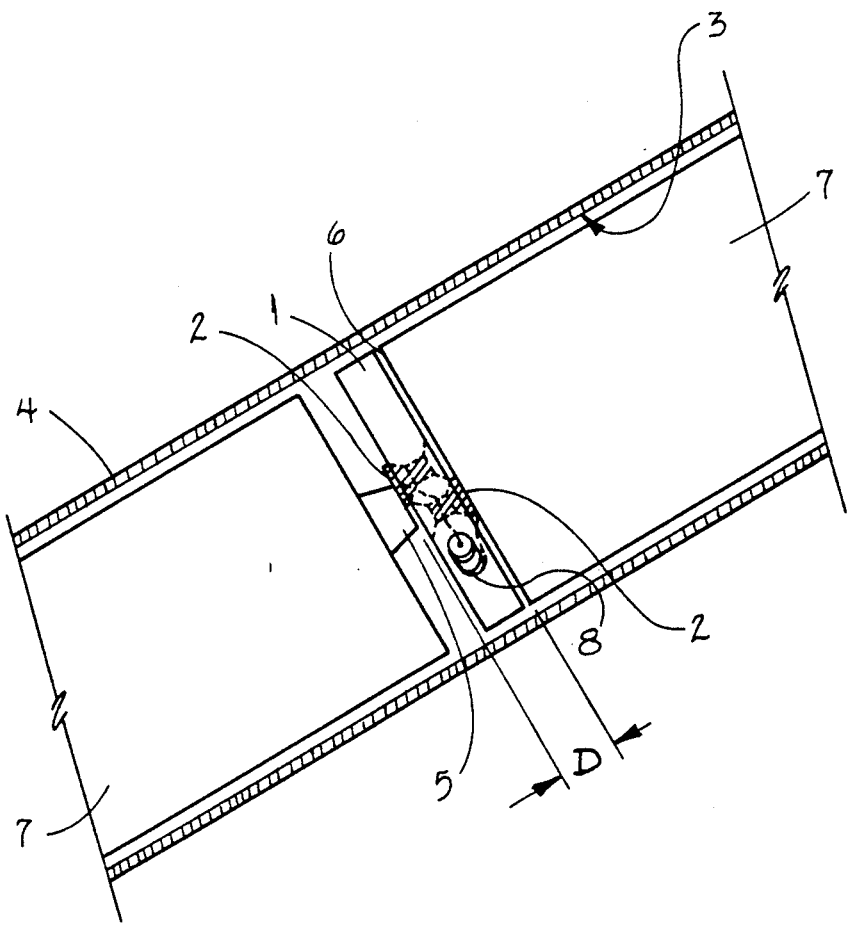
FIG. 2 provides a cross-sectional view, from the side, of the version of this invention illustrated in FIG. 1 positioned between two batteries in a battery powered apparatus.

FIG. 1 provides a perspective view of a disc shaped version of the instant invention and, in conjunction with FIG. 2, illustrates the primary design features and attributes of this version. The outline of the casing 1 in this version is circular This generally is the most advantageous shape for this invention as it holds the surface electrical contacts 2 in position via its proximity to the inner surface 3 of a battery compartment 4 at every point along the circumference of the casing 1.

Figure 3:
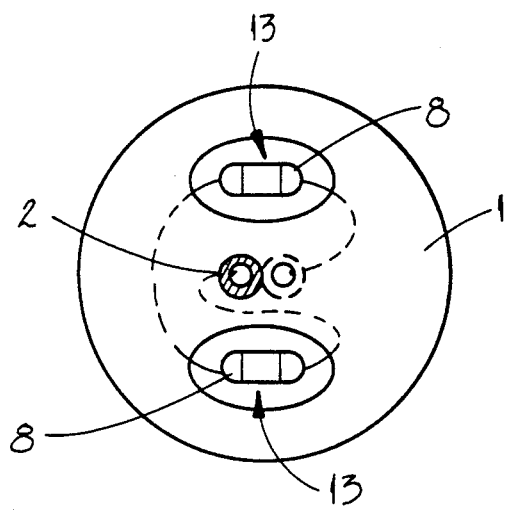
FIG. 3 provides a view of one of the faces of a disc shaped version of the instant invention having two resistors connected in series.

As will be obvious from a review of these figures and the other figures shown, this invention cannot function unless, as most clearly illustrated in FIG. 2, some portion of the electrical contacts 2 on its opposing faces are located along or adjacent to the central axis of the cylindrical space defined by the inner surface 3 of the battery compartment 4. As illustrated in FIG. 2, when constructed in this manner, the electrical contacts 2 of the device automatically contact the adjacent positive pole 5 and negative pole 6 of the batteries 7 between which the casing 1 is situated. Thus, as the two surface electrical contacts 2 are electrically connected via a resistor 8, or (as shown in FIG. 3) more than one resistor 8; these resistor(s) 8 become part of the circuit of the battery powered apparatus in which the instant invention is inserted.

Figure 4:
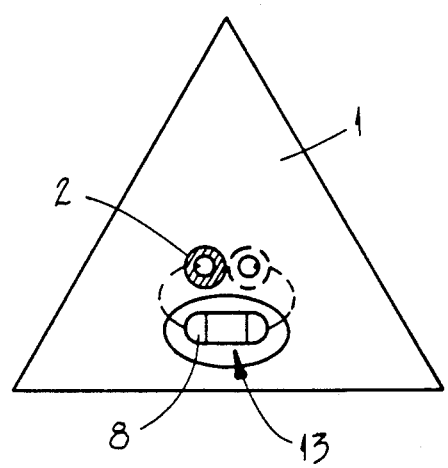
FIG. 4 provides a view of one of the faces of a version of the instant invention having a triangular outline.

The peripheral outline of the casing 1 principally serves to position and maintain the surface electrical contacts 2 along or adjacent to the central axis of the battery compartment 4. Thus, the peripheral outline of the casing 1 may be charged in numerous ways without exceeding the scope of this invention. Two examples of acceptable peripheral outlines can be seen in FIGS. 4 and 5. FIG. 4 illustrates an embodiment of the instant invention wherein the casing 1 has the peripheral outline of a triangle. In this configuration, the three points of the triangle would contact or be proximate to the inner surface 3 of the battery compartment 4, maintaining the position and location of the surface electrical contacts 2 along or adjacent to the cylindrical axis of the battery compartment 4. Numerous polygonal configurations have been constructed and proven equally useful for the purposes of this invention. In fact, all polygonals, including triangles, squares, rectangles, pentagons, and hexagons, whether having regular or irregular peripheral outlines, may be used for the peripheral outline of the casing 1 without exceeding the ambit and claims of this invention. The only important factor being, once again, the necessity that the peripheral outline used serve to appropriately position the surface electrical contacts 2 adjacent to or along the central axis of the battery compartment 4.

Figure 5:
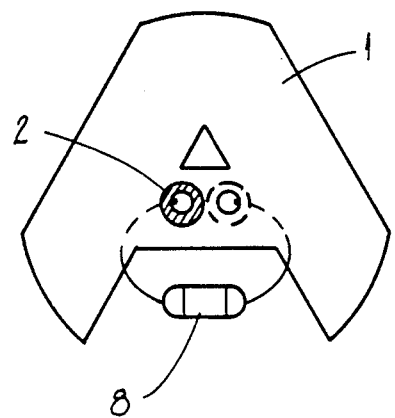
FIG. 5 provides a view of one of the faces of a version of the instant invention having the outline of the letter "A."

Likewise, numerous other designs and symbols can be used for the peripheral outline of the casing. Numerous embodiments have been constructed utilizing the peripheral outline of numbers, letters of the alphabets, stars, crosses, and other symbols. FIG. 5 illustrates one such embodiment having the outline of the letter "A." Without seeking, at this time, to define all configurations that would be associated with different peripheral uses, the inventor would note that the previously described variability in peripheral outline possible within the ambit of this invention is one of its important virtues as it allows different peripheral outlines to be used for different rated resistors and different purposes. This feature greatly facilitates tactile and visual identification and use, particularly in situations where lighting is limited or nonexistent. Color can also be used for identification. As the casing 1 will typically be constructed from plastic materials, different colors can be easily chosen and utilized for this purpose. This material is also easily notched or engraved for identification purposes, a further advantage inherent in its use.

While numerous peripheral outlines may be used for the casing I without any significant effect on function, the dimensions of the casing 1 are very important to its use. The casing 1 must be of appropriate size. If its effective radius is too small, it will not properly position the surface contacts 2 of the device along the central axis of the battery compartment 4. If it is too large, it will not be capable of insertion into the battery compartment 4. Batteries within each class of cylindrically shaped batteries are, as previously noted, substantially uniform in size and shape. None-the-less, there are slight variations in the diameters and lengths of "AA", "C", and "D" batteries. Further, there are slight variations in the interior diameters and lengths of battery compartments. However, it has been determined that the following dimensions may be advantageously used in the manufacture of the casing 1, and will produce a casing capable of insertion and use with the vast majority of battery powered apparatus using (and for use with) batteries of the sizes indicated below:

|  | Effective Radius "R" of the casing 1 | Effective Depth "D" of the casing 1 |
| --- | --- | --- |
| AA Batteries | .305 inch | .155 inch |
| C Batteries | .545 inch | .155 inch |

|   | Effective Radius "R" of the casing 1 | Effective Depth "D" of the casing 1 |
|---|---|---|
| D Batteries | .695 inch | .155 inch |

The effective radius "R" of the casing 1, as illustrated on FIG. 1, is the distance between the center of the casing 1 and the periphery or peripheral points of the casing 1 (which contact or are adjacent to the inner wall 3 of a battery compartment 4). The effective depth "D" as illustrated on FIG. 2 is the thickness, as seen from the side, of the casing 1 together with its surface electrical contacts 2. It should also be noted that construction in the manner illustrated in FIGS. 1 through 7, with the surface electrical contacts 2 extending slightly beyond the surface of the casing is advantageous as it facilitates a good electrical connection with the negative pole of the battery adjacent to the device.

Figure 6:
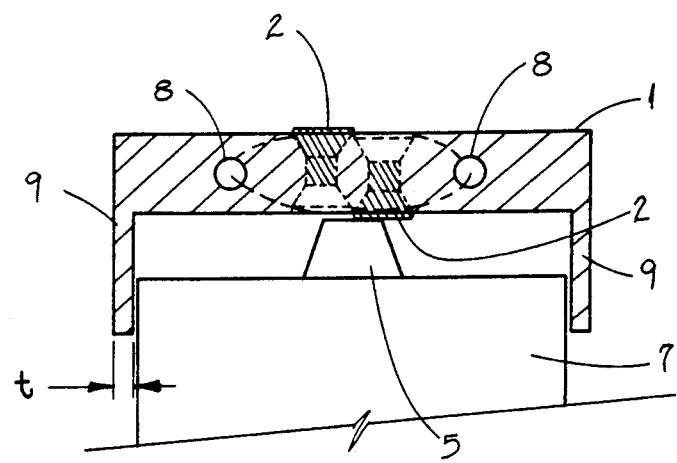
FIG. 6 provides a cross-sectional view, from the side, of a version of the instant invention having continuous side wall extending in one direction enabling it to be more firmly held in position.
Figure 7:
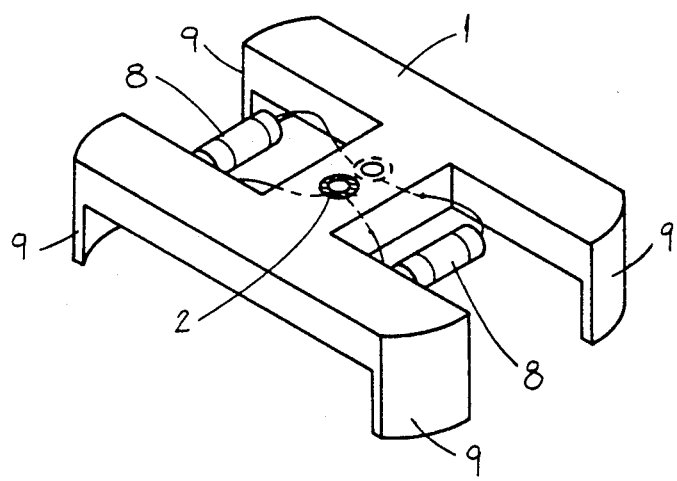
FIG. 7 provides a perspective view of a version of the instant invention having a segmented side wall extending in one direction, the outline of the letter "H", and two resistors in parallel connection.

Another feature possible with batteries of the classes described above is the addition of a sidewall 9 to the casing 1 as illustrated in FIGS. 6 and 7. The sidewall 9 helps in placing and maintaining the casing 1 in its functional position with relation to the battery 7. However, the sidewall 9 need not be continuous. Thus, by way of example, FIG. 7 illustrates an "H" shaped version of the invention having a sidewall 9 with arc shaped segments extending in one direction at right angles to the branches of the "H." As will be obvious from a review of this figure, numerous simple variations of the same type are possible without exceeding the scope of this invention. In FIG. 6, a continuous sidewall 9 "cups" and surrounds the end of the battery 7 adjacent to its positive pole 5. However, like the other versions illustrated in FIGS. 1 through 5, these versions are fully reversible, and will function equally well when placed around and adjacent to the end of a battery adjacent to its negative pole 6. Like the other configurations described, the wall thickness "t" of the sidewall 9 is important to its ability to be used with numerous battery manufactures. A minimal thickness should be sought. In this regard, it has been determined that a thickness "t" of approximately 0.020 inch may advantageously be used with casings of the dimensions previously described. It should be obvious that the sidewall 9 can extend on both sides of the casing 1, thereby "cupping" and surrounding the ends of both batteries between which it is positioned. Further, suitable thickening of the casing 1 and the sidewalls 9 will allow use of batteries with smaller sizes than normal with a battery powered device, as explained in more detail with reference to FIG. 9, infra.

FIG. 7 also illustrates the use of two resistors in parallel rather than in series. This arrangement can often serve as a means of minimizing the Depth "D" of the casing 1 while at the same time increasing the watt/power capacity of the invention. As previously noted, this dimension must generally be minimized in order for the casing 1 to be able to fit into a battery compartment 4 (due to the minimal leeway provided by the spring biasing means included in the battery compartment). However, the resistor(s) 8 utilized in this invention also have a diameter that must be taken into account. Their diameter generally provides a minimum value for "D"; thus, if their diameter can be minimized, "D" can be minimized. This goal can often be accomplished by use of resistor(s) in parallel connection as illustrated in FIG. 7. A resistor's size (including its diameter) is directly proportionate to its wattage (power) rating. The power "P" (measured in watts) passing through a resistor is equal to the voltage across the resistor multiplied by the current flowing through same ($P = V \times I$). In a series connection current "I" is constant; however, in a parallel connection, the total current is a equal to the sum of the currents flowing through each parallel branch. Thus, as the power "P" flowing through the resistor decreases as the current flow through same decreases, connection of resistors in parallel allows the use of smaller resistors having a lower wattage rating to form a circuit with more watt capacity while at the same time providing a casing with the minimum possible depth "D". The total resistance "R" in this configuration may be derived from the following equations (where $R_1$, $R_2$, and $R_3$ are resistors in parallel connection):

$$\frac{1}{R_T} = \frac{1}{R_1} + \frac{1}{R_2} + \frac{1}{R_3} \ldots$$

In the more typical arrangement, as illustrated in FIG. 7, where two resistors are utilized: $R_T = (R_1 \times R_2) \div (R_1 + R_2)$.

Figure 8:
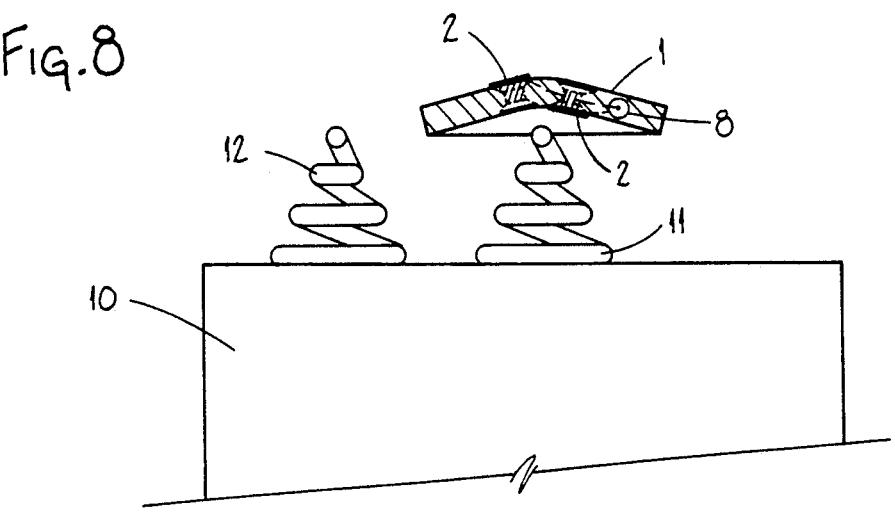
FIG. 8 provides a cross-sectional view, from the side, of a version of the instant invention having a substantially conical or hemispherical shape and adapted for use and insertion in devices powered by 6 volt lantern type batteries.

FIG. 8 illustrates an embodiment of the instant invention adapted for use with a square, 6 volt lantern battery 10, of the type manufactured for heavy-duty use and well known to those versed in the art. This battery type has a generally square cross-section with a conically shaped coil spring located in the approximate center of its upward surface serving as its negative pole 11 and a similar spring located approximately 1 and 1/16 inch away from its negative pole 11 serving as its positive pole 12. The instant invention can be readily adapted for use with a battery of this type by a minor modification in the cross-sectional shape of its casing. As illustrated in FIG. 8, a conical or hemispherical shape, producing an inverted "V" or "U" shape in cross-section, may be utilized for the casing 1 and, when produced in accordance with the teachings of this invention, will provide the benefits previously described when used with a battery of this type.

Figure 9:
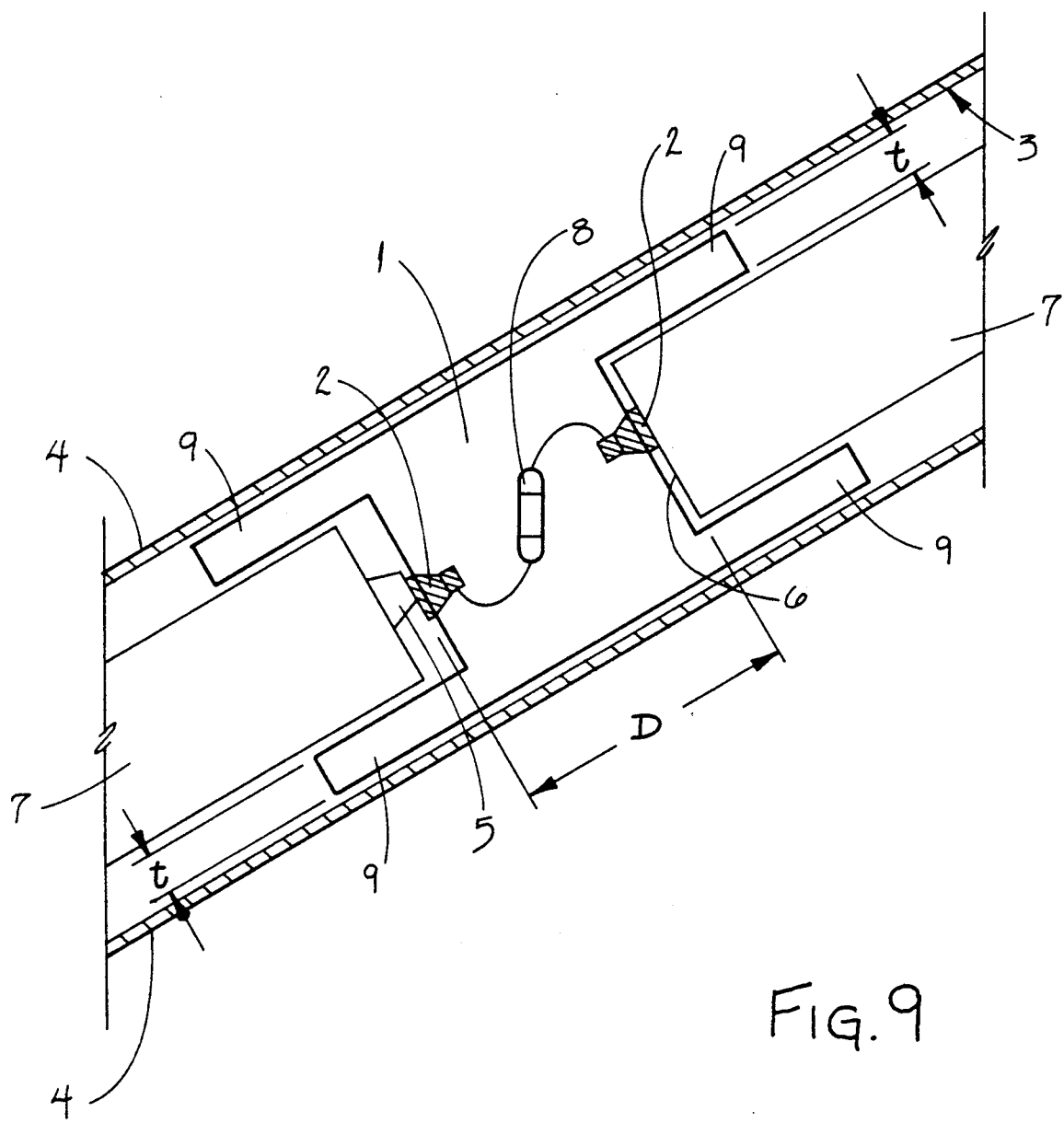
FIG. 9 provides a cross-sectional view, from the side, of a version of the instant invention having expanded sidewalls extending in two directions parallel to the first axis and other modifications allowing the substitution (when used with this version) of smaller sized batteries for those normally used in a dry-cell battery powered device.

FIG. 9 illustrates a version of this invention wherein certain dimensions of the sidewalls 9 and the casing 1 have been expanded to allow the replacement of the standard batteries utilized in the battery powered device by smaller batteries. The version illustrated features a continuous sidewall 9 extending in both directions so as to enclose both batteries between which the casing 1 is disposed. The casing 1 is cylindrical in the figure; however, as noted in the discussion related to FIG. 7, the side wall 9 may be segmented, and the casing 1 produced in any shape suitable for the purposes of this invention. Likewise, the side wall 9 may extend in only one direction (allowing only one battery to be replaced by a smaller battery), or in two directions (allowing two batteries to be replaced). Further, the portion of the sidewalls 9 extending in one direction need not have the same thickness as the portion extending in the other direction. Thus, versions can easily be produced that allow the replacement of two "D" batteries by one "C" and one "AA" battery. For a typical replacement, substituting two "C" batteries for two "D" batteries in a flashlight as shown in FIG. 9, suitable values for the dimensions noted are approximately 0.900 inches ("D"), and 1.80 inches ("t"). However, numerous variations of this type are possible, as set forth with approximated dimensions below.

| Batteries Replaced | Effective Depth "D" of the casing 1 | Thickness "t" of sidewall 9 |
| --- | --- | --- |
| 2 "D" batteries by 2 "C" batteries | .900 inch | .180 inch |
| 2 "D" batteries by 2 "AA" batteries | .900 inch | .405 inch |
| 1 "D" battery by 1 "C" battery | .500 inch | .180 inches (portion enclosing "C" battery) |
| 2 "D" batteries by 1 "C" and 1 "AA" battery | .900 inch | .180 inch (portion enclosing "C" battery) .390 inch (portion enclosing "AA" battery) |
| 1 "D" battery by 1 "AA" battery | .500 inch | .390 inch (portion enclosing "AA" battery) |
| 2 "C" batteries by 2 "AA" batteries | .155 inch | .245 inch |
| 1 "C" battery by 1 "AA" battery | .155 inch | .245 inch (portion enclosing "AA" battery) |

The primary design criteria to be observed in producing all of these versions of the instant invention are simple, the dimensions "D", and "t" must be such as to: (a) Position batteries smaller than those normally used in a device with their central axis aligned with the central axis of the battery compartment 4; and (b) place the positive and negative poles of these smaller batteries (that are not electrically connected to each other via this invention) in electrical contact either with the appropriate conducting contacts provided in the battery powered device for this purpose, or an adjacent battery. Thus, the invention can be utilized to create a multitude of well tested, weight reducing battery combinations.

Most of the embodiments of the casing 1 illustrated may be simply and inexpensively manufactured by selecting a sheet of appropriate non-conducting material for use in forming the casing 1 and cutting or die stamping said material to form a casing 1 of the desired dimensions. After forming the casing 1, if there is not a readily available location for placement of the resistor 8 (such a location exists, for example, in FIG. 5), an opening 13, as shown in FIGS. 1, 3 and 4, may advantageously be created having dimensions sufficient to accommodate the resistor 8. In the alternative, the opening 13 may be created in the initial step of die stamping the material to form the casing 1. Further, it is also possible to form the casing 1 with all other component parts in one unitary step by injection molding. In utilizing this method, all component parts would be initially disposed in their proper positions, as heretofore defined, within a preformed mold and a material suitable for injection molding injected into said mold and allowed to harden, thereby forming the casing 1. In utilizing injection molding it is still, however, of benefit to form an opening 13 in the casing as this allows more ready dissipation of any heat generated by the resistor 8. When producing the versions of this invention with expanded sidewalls 9 as discussed in conjunction with FIG. 9, it is preferable to begin with a hollow cylinder of materials, overall length, and other dimensions suitable for the sidewalls and to insert and fasten a "plug" containing resistors, etc., in its interior, thereby forming the configuration illustrated. A suitable material for use in all methods described is Lexan ® or some other readily molded, nonconducting plastic Conducting contacts 2 may be suitably formed from thin wall hollow core pure brass rivets, and contacts of this type are illustrated in all figures. In utilizing this type of contact, rivet holes may be initially drilled equidistant from the center of the casing 1 with diameters of .185 inch. In the alternative, such holes could, of course, be created during a die stamping process. Each hole is then chamfered on one side only, on opposite sides of the casing 1, to a depth of 0.050 inches Rivets may then be inserted from the unchamfered end of the hole and flared at the chamfered end by means well known in the art to secure them in their position. A means for connecting the leads of the resistor 8 to the conducting contacts 2 may then be created by drilling a hole 0.041 inches or more in diameter to each rivet and through its wall into its hollow interior. After trimming the leads of a selected resistor to appropriate length, these leads can then be inserted through said holes into the interior of each rivet and secured in position by soldering. In addition to the simplicity inherent in the use of the above described components, the arrangement described (i.e.—wherein the resistors are connected to a hollow thin wall brass rivet) allows the rivet to serve as a very efficient radiator for heat generated by the resistors The method of production discussed is, however, intended to be illustrative rather than exhaustive in nature. This invention may be produced in numerous ways. In this respect, therefore, as in all other matters, this invention is subject to wide variation without exceeding the ambit of the claims that follows.

We claim:
1. A current control apparatus for placement over a pole of a 6-volt battery, comprising:
   (a) a casing for placement over the pole of a 6-volt battery having a first end formed from non-conducting material, and a sidewall formed from non-conducting material with a substantially uniform thickness which is contiguous with and extends from said first end with substantial radial symmetry relative to an axis which is substantially perpendicular to said first end, such that the first end and sidewall thereby define an exterior surface for said casing and an interior surface for said casing which are both quasi-cylindrical in nature and are narrower proximate the first end than at the opposite end therefrom, the opposite end being open so as to allow a pole of a 6-volt battery to be inserted into said casing;
   (b) two conducting contacts located adjacent said axis, with one conducting contact on the exterior surface of said casing at the first end thereof and one conducting contact located on the interior surface of said casing proximate the first end thereof, such that said conducting contacts are physically and electrically separated by the non-conducting material from which the casing is formed; and
   (c) a current control means electrically connected between, and forming the sole electrical contact between, said two conducting contacts.

2. A current control apparatus for placement over a pole of a 6-volt battery, as set forth in claim 1, wherein the nature of the exterior surface and interior surface defined is substantially that of a hollow cone with the conducting contacts proximate the apex of said cone.

3. A current control apparatus for placement over a pole of a 6-volt battery, as set forth in claim 1, wherein the nature of the exterior surface and interior surface defined is substantially that of a hollow hemisphere with the conducting contacts proximate the apex of said hemisphere.

4. A current control apparatus for insertion into battery powered devices, comprising:
   (a) a plurality of resistors connected in parallel;
   (b) a casing formed from electrically non-conducting materials enclosing said plurality of resistors, having its minimum dimension along a first axis, and its maximum dimension along a plurality of second axes which intersect the first axis and each other at a single point, are all at right angles to the first axis, and are approximately equal in length to the width of the battery compartment of the battery powered device into which the apparatus is to be inserted; and
   (c) two conducting contacts located adjacent to the first axis of said casing on opposite faces of said casing, each conducting contact being electrically connected to the other via said plurality of resistors.

5. A current control apparatus for insertion into battery powered devices, as set forth in claim 4, wherein the minimum dimension, is approximately 0.155 inches.

6. A current control apparatus for insertion into battery powered devices, as set forth in claim 4, wherein the maximum dimension, is approximately 0.610 inches.

7. A current control apparatus for insertion into battery powered devices, as set forth in claim 4, wherein the maximum dimension, is approximately 1.090 inches.

8. A current control apparatus for insertion into battery powered devices, as set forth in claim 4, wherein the maximum dimension, is approximately 1.390 inches.

9. A current control apparatus for insertion into battery powered devices, comprising:
   (a) a current control means;
   (b) a casing formed from electrically non-conducting materials enclosing said current control means, having its minimum dimension along a first axis, and its maximum dimension along a plurality of second axes which intersect the first axis and each other at a single point, are all at right angles to the first axis, and are approximately equal in length to the width of the battery compartment of the battery powered device into which the apparatus is to be inserted, said casing further having the peripheral outline, in a plane parallel to, and including, the second axes and at right angles to the first axis, of a bilaterally symmetrical geometric figure having all sides of equal length; and
   (c) two conducting contacts located adjacent to the first axis of said casing on opposite faces of said casing, each conducting contact being electrically connected to the other via said current control means.

10. A current control apparatus for insertion into battery powered devices, comprising:
    (a) a current control means;
    (b) a casing formed from electrically non-conducting materials enclosing said current control means, having its minimum dimension along a first axis, and its maximum dimension along a plurality of second axes which intersect the first axis and each other at a single point, are all at right angles to the first axis, and are approximately equal in length to the width of the battery compartment of the battery powered device into which the apparatus is to be inserted, said casing further having the peripheral outline, in a plane parallel to, and including, the second axes and at right angles to the first axis, of a bilaterally symmetrical figure not having all sides of equal length; and
    (c) two conducting contacts located on opposite faces of said casing proximate to or overlapping the first axis of said casing, each conducting contact being electorally connected to the other via said current control means, 11. A current control apparatus for insertion into battery powered devices, comprising:
    (a) a current control means;
    (b) a casing formed from electrically non-conducting materials enclosing said current control means, having its minimum dimension along a first axis, and its maximum dimension along a plurality of second axes, which intersect the first axis and each other at a single point and are all at right angles to the first axis annd are approximately equal to the diameter of the battery compartment of the battery powered device into which the apparatus is to be inserted said casing further having the peripheral outline, in a plane parallel to, and including, the second axes and at right angles to the first axis, of a nonsymmetrical figure; and
    (c) two conducting contacts located adjacent to the first axis of said casing on opposite faces of said casing, each conducting contact being electrically connected to the other via said current control means.

12. A current control apparatus for insertion into battery powered devices, set forth in claim 1, comprising:
    (a) a current control means;
    (b) a casing formed from electrically non-conducting materials enclosing said current control means having its minimum dimension along a first axis, and its maximum dimension along a plurality of second axes which intersect the first axis and each other at a single point, are all at right angles to the first axis, and are approximately equal inn length to the width of the battery compartment of the battery powered device into which the apparatus is to be inserted;
    (c) two conducting contacts located adjacent to the first axis of said casing on opposite faces of said casing, each conducting contact being electrically connected to the other via said current control means; and
    (d) a plurality of linear extensions extending from points on the periphery of the casing proximate to second axes thereof in two directions therefrom so as to be parallel to the first axis thereof and to lie adjacent to the sides of the two batteries when the casing is disposed between two batteries within the battery compartment of a battery powered device.

13. A current control apparatus for insertion into battery powered devices, as set forth in claim 12, wherein the minimum dimension along the first axis of the casing is approximately 0.900 inches and the thickness of the linear extensions is approximately 0.180 inches.

14. A current control apparatus for insertion into battery powered devices, as set forth in claim 12, wherein the minimum dimension along the first axis of the casing is approximately 0.900 inches and the thickness of the linear extensions is approximately 0.405 inches.

15. A current control apparatus for insertion into battery powered deices, as set forth in claim 12, wherein said linear extensions are connected to form a cylinder having interior diameters slightly greater than the batteries enclosed by the cylinder and a maximum, exterior diameter slightly less than that of the battery compartment within which it is to be disposed.

16. A current control apparatus for insertion into battery powered devices, as set forth inn claim 12, wherein the minimum dimension along the first axis of the casing is approximately 0.155 inches and the thickness of the linear extensions is approximately 0.245 inches.

17. A current control apparatus for insertion into battery powered devices, as set forth in claim 12, wherein the minimum dimension along the first axis of the casing is approximately 0.900 inches and the thickness of the linear extension is approximately 0.180 inches on one side of the casing and 0.390 inches on the other side of the casing.

18. A current control apparatus for insertion into battery powered devices, comprising:
  (a) a current control means;
  (b) a casing formed from electrically non-conducting materials enclosing said current control means, having its minimum dimension along a first axis, and its maximum dimension along a plurality of second axes which intersect the first axis and each other at a single point, are all at right angles to the first axis, and are approximately equal in length to the width of the battery compartment of the battery powered device into which the apparatus is to be inserted;
  (c) two conducting contacts located adjacent to the first axis of said casing on opposite faces of said casing, each conducting contact being electrically connected to the other via said current control means; and
  (d) a plurality of linear extensions extending from points on the periphery of the casing proximate to second axes thereof in one direction therefrom so as to be parallel to the first axis thereof annd to lie adjacent to the sides of one battery when the casing is disposed with batteries within the battery compartment of a battery powered device.

19. A current control apparatus for insertion into battery powered devices, as set forth in claim 18, wherein the minimum dimension along the first axis of the casing is approximately 0.500 inches and the thickness of the linear extensions is approximately 0.180 inches.

20. A current control apparatus for insertion into battery powered devices, as set forth in claim 18, wherein the minimum dimension along the first axis of the casing is approximately 0.500 inches and the thickness of the linear extensions is approximately 0.390 inches.

21. A current control apparatus for insertion into battery powered devices, as set forth in claim 18, wherein the minimum dimension along the first axis of the casing is approximately 0.155 inches and the thickness of the linear extensions is approximately 0.245 inches.

22. A current control apparatus for insertion into battery powered devices, as set forth in claim 18, wherein said linear extensions are connected so as to form a cylinder having an interior diameter slightly greater than the battery enclosed by the cylinder and a maximum, exterior diameter slightly less than that of the battery compartment within which it is to be disposed.

* * * * *

UNITED STATES PATENT AND TRADEMARK OFFICE
CERTIFICATE OF CORRECTION

PATENT NO. : 5,034,720

DATED : July 23, 1991

INVENTOR(S) : Howard F. Bell et al

It is certified that error appears in the above-identified patent and that said Letters Patent is hereby corrected as shown below:

In the Cover Page -

In the section titled "References Cited", "Kard", should be --Karo--.

In the Abstract, line 1, delete "easily".

In the Abstract, line 4, after "means", insert --enclosed in an electrically nonconducting casing, which casing--.

In the Abstract, line 5, before "may", delete -- and --.

Column 2, line 10, after "elements", insert --.--.

Column 2, line 19, after "batteries", insert --.--.

Column 3, line 14, after "having", insert --a--.

Column 3, line 42, after "circular", insert --.--.

Figure 10:
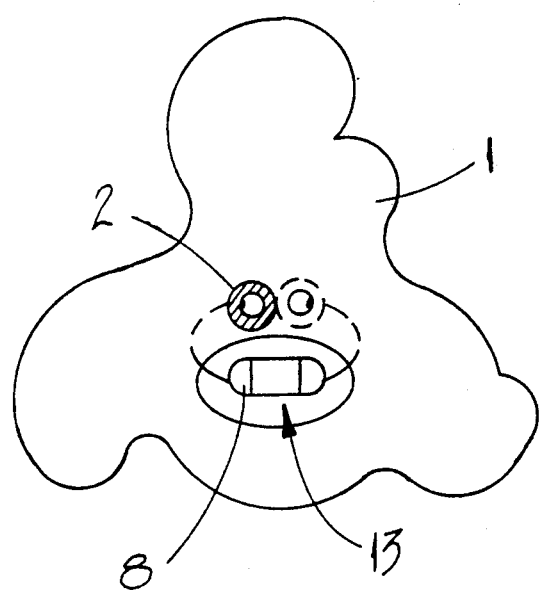
FIG. 10 provides a view of one of the faces of a version of the instant invention having a nonsymmetrical outline.

Column 4, line 21, after "4.", insert --.  Thus, it is possible to have a version with a nonsymmetrical outline as illustrated in FIG. 10 as well as the more regular and symmetrical figures described above.--.

Column 4, line 44, delete "I", and insert "1".

UNITED STATES PATENT AND TRADEMARK OFFICE
CERTIFICATE OF CORRECTION

PATENT NO. : 5,034,720

DATED : July 23, 1991

INVENTOR(S) : Howard F. Bell et al

It is certified that error appears in the above-identified patent and that said Letters Patent is hereby corrected as shown below:

Column 5, line 17, after "casing", insert --1,--.

Column 6, line 14, delete "R", and insert --$R_T$--.

Column 6, line 23, delete "($R_1$ X $R_2$) +", and insert --($R_1$ x $R_1$)+ --.

Column 6, line 68, delete "approximated", and insert --approximate--.

Column 7, line 58, after "casing", insert --1--.

Column 7, line 68, after "plastic", insert --.--.

Column 8, line 9, after "inches", insert --.--.

Column 8, line 24, after "resistors", insert --.--.

In Claim 5, column 9, line 24, after "dimension,", insert -- along the first axis of said casing, --.

In Claim 6, column 9, line 27, after "dimension," insert -- along a second axis of said casing, --.

In Claim 7, column 9, line 30, after "dimension,", insert -- along a second axis of said casing, --.

In Claim 8, column 9, line 33, after "dimension,", insert -- along a second axis of said casing, --.

In Claim 10, column 10, line 8, delete "electorally", and insert -- electrically --.

UNITED STATES PATENT AND TRADEMARK OFFICE
CERTIFICATE OF CORRECTION

PATENT NO. : 5,034,720

DATED : July 23, 1991

INVENTOR(S) : Howard F. Bell et al

It is certified that error appears in the above-identified patent and that said Letters Patent is hereby corrected as shown below:

In Claim 10, column 10, line 9, delete ",", and insert -- . --.

In Claim 11, column 10, line 19 delete "annd", and insert -- and --.

In Claim 12, column 10, line 32, delete "set forth in Claim 1,".

In Claim 12, column 10, line 41, delete "inn", and insert -- in --.

In Claim 12, column 10, line 54, delete "of the", and insert -- of --.

In Claim 15, column 11, line 2, delete "deices" and insert -- devices --.

UNITED STATES PATENT AND TRADEMARK OFFICE
CERTIFICATE OF CORRECTION

PATENT NO. : 5,034,720

DATED : July 23, 1991

INVENTOR(S) : Howard F. Bell et al

It is certified that error appears in the above-identified patent and that said Letters Patent is hereby corrected as shown below:

In Claim 16, column 11, line 9, delete "inn", and insert-- in --.

In Claim 18, column 12, line 6, delete "annd", and insert -- and --.

Signed and Sealed this

Twenty-eighth Day of January, 1992

Attest:

HARRY F. MANBECK, JR.

*Attesting Officer*  *Commissioner of Patents and Trademarks*